UNITED STATES PATENT OFFICE.

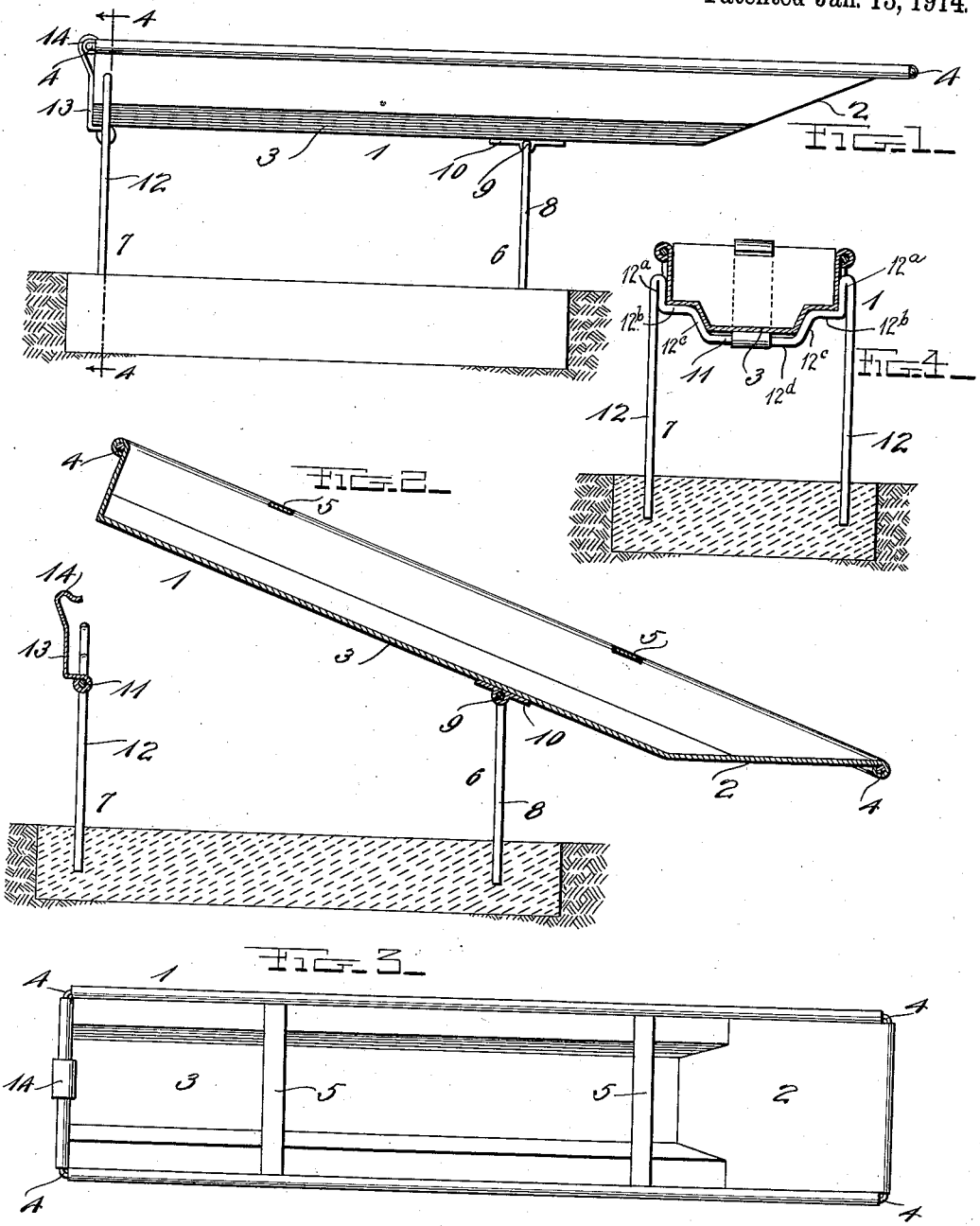

RUFUS E. MORRIS, OF RUNNELLS, IOWA, ASSIGNOR OF ONE-HALF TO U. G. ENYART, OF RUNNELLS, IOWA.

WATER-TROUGH.

1,084,452.  Specification of Letters Patent.  Patented Jan. 13, 1914.

Application filed December 28, 1911. Serial No. 668,209.

*To all whom it may concern:*

Be it known that I, RUFUS E. MORRIS, a citizen of the United States, residing at Runnells, in the county of Polk and State of Iowa, have invented certain new and useful Improvements in Water-Troughs; and I do declare the following to be a full, clear, and exact description of the invention, such as will enable others skilled in the art to which it appertains to make and use the same.

This invention relates to improvements in water troughs.

One object of the invention is to provide a water trough having an improved construction and arrangement of supporting mechanism whereby the trough may be readily tilted to discharge the contents thereof, thus facilitating the cleaning of the trough and the removal of the ice or other matter therefrom.

Another object is to provide a trough of this character which will be simple, strong, durable and inexpensive in construction, efficient in operation and which has its bottom constructed in such a manner that an animal may readily drink therefrom when the trough contains only a small quantity of water.

With these and other objects in view the invention consists of certain novel features of construction, and the combination and arrangement of parts as will be more fully described and claimed.

In the accompanying drawings; Figure 1 is a side view of my improved trough showing the same in operative position; Fig. 2 is a vertical longitudinal sectional view showing the trough in a tilted position for discharging the contents thereof or for washing out the trough; Fig. 3 is a top plan view of the trough; Fig. 4 is a vertical cross sectional view on the line 4—4 of Fig. 1.

Referring more particularly to the drawings, 1 denotes my improved trough which may be of any suitable shape and constructed of any suitable material. The trough 1 is here shown and is preferably constructed of sheet metal and is of rectangular oblong shape. One end of the trough is formed at an angle or inclination to provide a discharge spout 2 from which the contents of the trough may be readily discharged when the latter is tilted as will be hereinafter more fully described. The bottom of the trough is depressed to form a centrally disposed narrow channel 3 which is provided to permit the animals to more readily drink from the trough when the water therein has reached a low level. The upper edges of the sides and ends of the trough are preferably beaded or bent around a binding rod or wire 4 as shown whereby said edges of the sides and ends are strengthened and braced. The sides of the trough are further braced by a series of cross bars 5 secured at their ends to the sides near the upper edges thereof.

The trough is pivotally supported at a suitable elevation upon members 6 and 7, the member 6 comprising a metal rod bent into the form of an arch and comprising supporting legs 8 and a trough engaging portion 9 to which the trough is hingedly connected near the discharge end thereof by a metal strip or hinge member 10 secured to the bottom of the trough in any suitable manner. The outer ends of the legs 8 are firmly secured in the ground or are embedded in a concrete anchoring block whereby the supporting member 6 is rigidly held in position to pivotally support the trough. The supporting member 7 comprises a rod bent or folded upon itself midway between its ends and at points spaced from each other to form reinforce standards 12ª for engaging opposite sides of the trough to hold it against lateral movement. The rod is then bent laterally inward to provide supporting shelves 12ᵇ extending toward each other and is then bent downwardly and inwardly from the free ends of these shelves to form inclined engaging elements 12ᶜ and then laterally at right angles to form a straight support 12ᵈ for the depression in the bottom of the trough and which also operates as a pintle for the latch 3. This bending of rod 7 forms a seat 11 the shape of which corresponds to the shape of the bottom and sides of the trough. The ends of the rod after being bent to form the seat are bent downwardly to form supporting legs 12 which are also firmly secured in the ground or in a concrete anchoring block or other supporting base. The supporting member 7 is arranged in position to receive the square end of the trough when the latter is in a horizontal or operative position as shown in Fig. 1 of the drawing. It will be noted that the supporting member 6 is attached to the trough near the discharge end thereof so that this end will be overbalanced by the weight of the opposite end which will cause the latter end to swing down into the supporting member 7. This over-balancing arrangement of the trough will restore and hold the same in a horizontal position on the supporting frames and will permit the trough to be readily tilted to discharge the contents thereof from the discharge end or spout of the trough thus facilitating the emptying and cleaning thereof.

While the over-balancing arrangement of the trough will hold the same in operative position under normal conditions, I may if desired, provide a suitable means for positively holding the trough in an operative position, said means being here shown and preferably comprising a catch 13 in the form of a metal plate having one end bent at right angles and loosely connected with the seat 11 of the supporting member 7 and having its opposite end bent into the form of a spring hook 14 which is adapted to be sprung into engagement with the upper edge of the square end of the trough as clearly shown in the drawing.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as claimed.

Having thus described my invention what I claim is;

In a water trough, an endwise tilting trough body having a depression in its bottom, an upright end and a beveled discharge end, supporting members therefor, means for hinging said trough adjacent its beveled discharge end to one of said members, the other member comprising a rod folded upon itself intermediately of its ends at points spaced from each other, the end portions of the rod forming upright standards, and the intermediate portion of the rod being bent to fit around the depressed bottom of the trough body and having a straight central part forming a latch pintle, and a latch plate pivoted on said pintle and having a resilient hook at its free end for detachable engagement with the upper edge of the upright end wall of said trough body to hold the latter down in the last mentioned supporting member.

In testimony whereof I have hereunto set my hand in presence of two subscribing witnesses.

RUFUS E. MORRIS.

Witnesses:
  T. N. MILLER,
  S. S. JOHNSTON.

---

Copies of this patent may be obtained for five cents each, by addressing the "Commissioner of Patents, Washington, D. C."